Sept. 20, 1932.  A. LESAGE  1,878,975
BICYCLE WITH AUXILIARY MOTOR
Filed Jan. 2, 1932
Fig. 1.
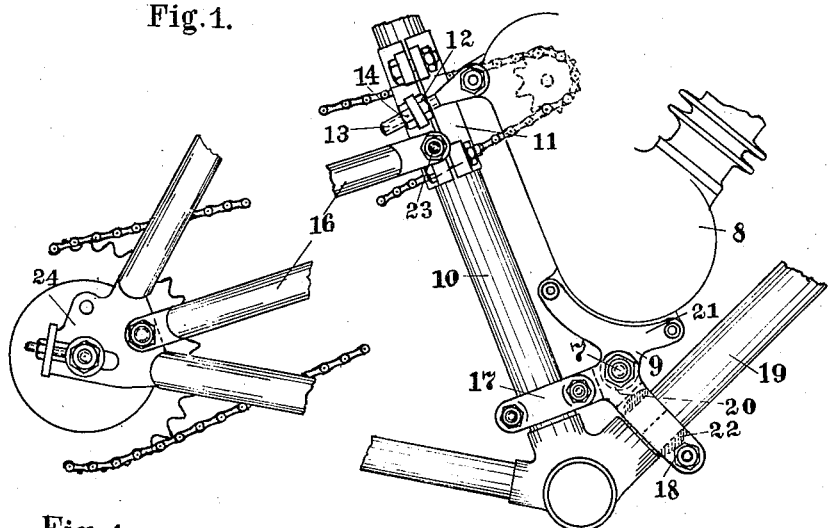
Fig. 4.  Fig. 2.  Fig. 3.
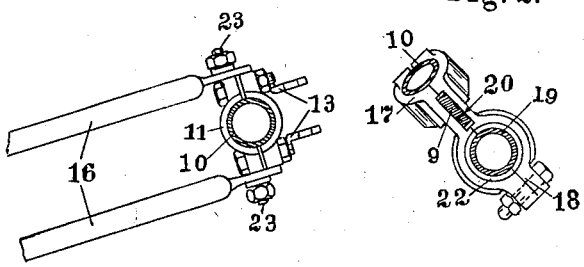 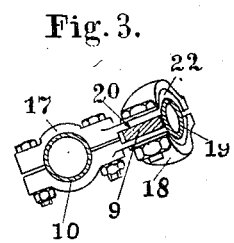
Fig. 5.
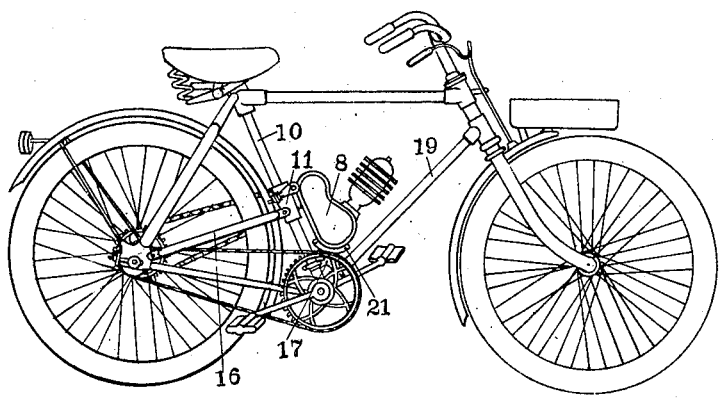
Inventor
Alfred Lesage
per
Dean Fairbank Hirsch & Foster
Attys Patented Sept. 20, 1932

1,878,975

UNITED STATES PATENT OFFICE

ALFRED LESAGE, OF SCHWEINFURT IN BAVARIA, GERMANY

BICYCLE WITH AUXILIARY MOTOR

Application filed January 2, 1932, Serial No. 584,548, and in Germany June 7, 1930.

The invention relates to motor-cycles, and more especially to the equipment or mounting with an auxiliary motor by means of fastenings allowing of the ready attachment or removal of the motor without requiring alteration of the bicycle itself which may be of the usual type.

The object of the invention is to provide fastenings which adapt themselves to the shape of the bicycle frame, while permitting the motor to assume a convenient position within the frame in which it is enclosed and protected between the frame tubes, but capable of adjustment in the plane of the frame, thereby causing tightening of the chain which transmits power from the motor to the rear wheel.

This object is attained by the application of a two-armed angular brace or bracket to the frame tubes beginning at the crank axle box, whereby it embraces said tubes near the box and projects in the acute angle formed by the tubes. A lug provided at the lower end of the motor is received in a recess of the top of the bracket and secured therein by a bolt passing through the said parts. This connection allows the motor to rock on the supporting bracket lengthwise the frame.

Another object of the invention is the adaptation of the arms of the bracket to the relative position of the frame tubes by means of a swivel ring provided within at least one arm of the bracket.

The motor can further be immobilized at its upper part upon a frame tube through an adjustable connecting clamp, whereby the motor will be pivoted on the two-armed bracket and adjusted in a position in which the driving chain will be tightened.

An embodiment of the invention is illustrated, by way of example, in the annexed drawing, which forms a part of this specification and in which—

Fig. 1 illustrates a part of a bicycle frame provided with the novel fastening means, and a part of the motor in a side elevation, Figs. 2 and 3 show an angular fastening bracket or clip in different perspective views, Fig. 4 is a top plan view of the upper fastening clip and of connecting tubes, and Fig. 5 is a side elevation of a bicycle with the motor mounted therein, on a smaller scale.

Like numerals denote like parts throughout all figures of the drawing.

The lower portion of the crank casing 8 of the motor is fastened to the cycle frame by means of an angular bracket composed of two parts the arm 17 of which is fixed around the saddle-supporting tube 10 above the crank axle bearing 5 while the other arm 18 of the said bracket is attached to the lower frame tube 19. The two halves of the bracket are rigid pieces and assembled in the usual manner by bolts as shown in Figs. 1 to 3. In the central and top part the faces of the two halves opposite each other are recessed so that a cut-out portion 20 is formed in which a lug 9 of an intermediate piece 21 is received. The bracket and the intermediate piece are pivotally connected to each other by a bolt 7 passing through the lug 9 and the top part of the said bracket. At the same time the said bolt 7 contributes for holding the bracket halves together. The part of the arm 18 surrounding the tube 19 is shaped as a hollow sphere and contains a split ring 22 which is shaped as a sphere on its outside in accordance with the hollow sphere referred to. When the bracket is forced together, the said ring engages the frame tube 19 and at the same time adjusts itself within the arm 18 according to the angle formed by the two tubes 10 and 19, prior to being fully compressed. By means of the said adjusting ring 22 the bracket will be safely fastened without risk of the frame being warped under tension.

The intermediate piece 21 is mounted on the crank case 8 of the motor in any suitable way, e. g., by rivets, as shown, or screw bolts. The said piece surrounding the bottom of the crank case in a certain extent, so contributes to the whole unit being strengthened.

The device intended for securing the top portion of the crank case 8 to the saddle-supporting tube 10 is also made in the shape of a clip 11 in respect to which adjusting screw threaded rods 13 connected to the upper end of the said case 8 may be adjusted in eyes 12 of the clip by means of nuts 14.

Moreover, the clip 11 is preferably provided on its sides with threaded projections 23 to which are secured by means of nuts the front ends of stiffening tubes 16 leading to the end piece 24 of the rear fork.

This construction of the bracket and its attachment to the frame permit of a ready and reliable interconnection and a convenient pivotal support of the motor in the frame of a bicycle without requiring alteration or working of the frame. Besides these advantages, the motor can be easily rocked to adjust it for tightening of the chain transmitting the drive to the rear wheel of the cycle or for other desirable purposes.

What I claim is—

1. In a motor cycle, the combination with a usual bicycle frame, of an angular rigid bracket having two arms embracing the frame tubes above the crank axle bearing, a motor, a lug provided on the lower end of the motor, a pivot bolt passing through said lug and the top part of said bracket, and means for adjustably attaching the upper part of the motor to the frame.

2. The combination with a bicycle frame of usual type, of a motor located therein, an angular rigid bracket having two arms and composed of two halves, bolts assembling said halves around the frame tubes near and above the crank axle bearing of said frame, a lug provided on the lower part of the motor and received in a recess formed in the top of said bracket, a pivot bolt passing through the lug and both halves of the bracket, and means capable of adjustably attaching the upper part of the motor to the frame.

3. The combination with a bicycle frame of usual type, of a motor mounted therein, an angular rigid bracket having two arms embracing the tubes of said frame near and above the crank axle bearing, an adjustable spanning ring arranged in at least one arm of the bracket, a lug provided on the lower end of said motor, a pivot bolt engaging bores of the lug and the top of the bracket, and means for the adjustable attachment of the upper part of the motor to a frame tube.

4. The combination with a cycle frame of the usual type, of an angular rigid bracket having arms embracing the tubes of the frame near and above the crank axle bearing of the frame, a motor supported by, and pivotally connected to, the said bracket, a clip embracing the saddle-supporting tube of the frame, eyes formed on the side faces of said clip, screw threaded rods engaging said eyes and pivotably attached to the upper part of the motor, and adjusting nuts screwed upon said rods.

In witness whereof I have signed my name to this specification.

ALFRED LESAGE.